United States Patent [19]

Oiestad

[11] Patent Number: 4,821,486
[45] Date of Patent: Apr. 18, 1989

[54] DEVICE FOR WRAPPING CYLINDRICAL OBJECTS

[76] Inventor: Jens Øiestad, Vestre Øiestad, N-4880 Rykene, Norway

[21] Appl. No.: 144,017
[22] Filed: Jan. 13, 1988
[51] Int. Cl.⁴ ............................................. B65B 11/04
[52] U.S. Cl. ........................................ 53/170; 53/556; 53/587; 53/211
[58] Field of Search ................. 53/556, 587, 211, 170, 53/588

[56] References Cited

U.S. PATENT DOCUMENTS

| 4,255,918 | 3/1981 | Lancaster | 53/556 |
| 4,282,700 | 8/1981 | Goldstein | 53/556 |
| 4,300,326 | 11/1981 | Stackhouse | 53/587 X |
| 4,563,863 | 1/1986 | Humphrey | 53/556 |
| 4,565,051 | 1/1986 | Back | 53/556 X |
| 4,641,484 | 2/1987 | Popelka | 53/587 X |
| 4,685,270 | 8/1987 | Beambilla | 53/556 X |

FOREIGN PATENT DOCUMENTS 2159489 12/1985 United Kingdom ................. 53/211

Primary Examiner—John Sipos
Attorney, Agent, or Firm—Leydig, Voit & Mayer

[57] ABSTRACT

A device for wrapping cylindrical objects, especially bales of straw or hay fodder, comprising at least two driven horizontal rollers which are arranged at a mutual distance less than the diameter of the object and are intended for driving support of the object, and a driven crank mechanism intended for carrying a vertically standing roll of a stretchable self-adhesive film for moving the roll in a horizontal path around the bale at the center of the latter. The driven supporting rollers are arranged as freely projecting prongs from a lifting device that is front or back mounted on a tractor or the like. The prongs formed by rollers are arranged to project from, and at right angles to, a rigid frame which on the side facing away from the teeth is provided with two attachment means at its lower portion, the attachment means being provided at a mutual distance to be connected with two lifting arms on a vehicle, and further attachment means provided centrally between and at the same side as the two attachment means at the upper portion of the frame, intended for connection with an adjustable tension stay.

17 Claims, 2 Drawing Sheets

DEVICE FOR WRAPPING CYLINDRICAL OBJECTS

The present invention relates to a device for wrapping cylindrical objects, especially bales of straw or hay fodder with stretchably self-adhesive film, generally known as stretch film. Straw and hay fodder, is now increasingly baled into round bales, i.e. large bales of compressed straw or hay in the shape of a circular cylinder. The object of wrapping such bales, as far as hay is concerned, is to cause ensiling of the hay. The hay is dried only to a degree at which it retains part of its moisture before being compressed into a bale. The resulting silage retains most of its natural consistency and nutritional value without the addition of any ensiling agent. In this way the fodder is made more easily digestible for the animals. As regards straw, leaching or gassing may be carried out in the bale itself, and it is possible to avoid the bulky and expensive wrapping of the larger number of bales previously necessary for such treatment.

Several devices for wrapping bales of straw feed are known, for example from European published patent application No. 0 110 110. This wrapping device is mounted on a separate carriage that is towed behind a baling machine. A disadvantage of this device, however, is that manual work is needed to displace the bale from the baler to the device. The device per se is expensive because it requires a separate carriage.

It is an object of the present invention to provide a device for wrapping such cylindrical objects that is inexpensive to produce and requires a minimum of manual work in use.

According to one aspect the present invention consists in a device for wrapping cylindrical objects, especially bales of straw or hay, comprising at least two rotatable rollers spaced apart a distance less than the diameter of the object and, in use of the device, being substantially horizontal and intended to support the object, at least one of the rollers being rotationally driven to rotate the object about the axis of its cylindrical shape, and carrier means for supporting a roll of stretchable self-adhesive film with the axis of the roll at right angles to a plane containing the main axis of the object and for moving the roll orbitally around the object with the roll intersecting the plane characterized in that the rollers are arranged as prongs freely projecting from means adapted to be connected to a lifting device mounted on a tractor or other vehicle.

The supporting rollers, two for instance, are thus mounted on a vehicle in just the same way as are the prongs of a fork-lift. Bales set down by a round baler are each lifted in turn a distance from the ground by the prongs or rollers of the device. By driven rotation of the rollers the bale is rotated about the central axis of the cylinder of the bale which is parallel to the rollers. During rotation the plastic film roll is moved around the rotating bale at the level of its centre. When the bale has rotated 180° the film roll has made five complete turns around the bale and the bale is then completely wrapped with ample overlap between each layer. This wrapping may occur while the bale is being driven to a place of storage.

According to a second aspect the present invention consists in a device for wrapping cylindrical objects, especially bales of straw or hay, comprising at least two rotatable rollers spaced apart a distance less than the diameter of the object and, in use of the device, being substantially horizontal and intended to support the object, at least one of the rollers being rotationally driven to rotate the object about the axis of its cylindrical shape, and carrier means for supporting a roll of stretchable self-adhesive film with the axis of the roll at right angles to a plane containing the main axis of the object and for moving the roll orbitally around the object with the roll intersecting the plane characterized in that the device comprises a collector movable, across that part of the path of the film which extends from the roll to the object, into film-gripping engagement with a stop, and a knife adjacent the stop with its cutting edge directed towards the film, the arrangement being such that during its movement, which occurs at the end of a full wrapping cycle, the collector gathers the film and urges the film against the stop and the knife, the film being cut by the knife and the free end of film coming from the roll being gripped between the collector and the stop.

Further features and details of both aspects of the invention will appear from the subclaims and the following disclosure with reference to the drawings showing an embodiment of the invention.

Figure 1:
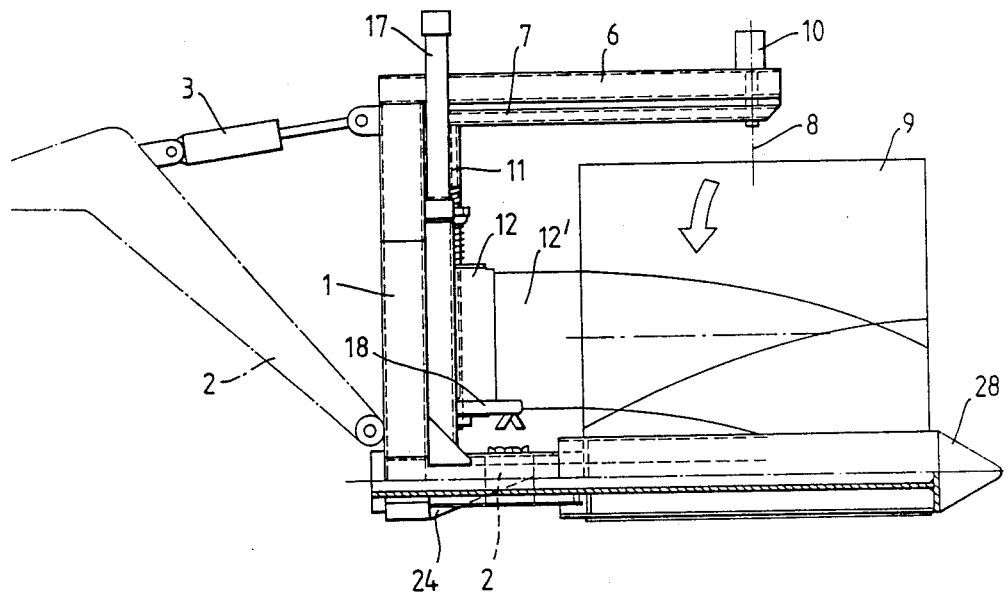
FIG. 1 shows a wrapping device according to the invention in side elevation.

The device illustrated in FIGS. 1 to 4 comprises a frame 1 which is arranged in use to be vertical and hinged by its lower portion to lifting arms 2 that are standard equipment of a tractor (not shown), or another agricultural vehicle. The frame may alternatively be mounted for vertical movement on the mast of a fork lift truck. Arms 2 in the illustrated embodiment are the lifting arms of a front mounted loader, but frame 1 can be secured in a similar manner to rear mounted lifting arms on a tractor or the like. The upper portion of frame 1 is connected to the lifting arms 2 by means of an adjustable top stay 3 preferably in the form of a hydraulic ram, as shown in the drawing. The intended use of this ram will be disclosed below. The frame 3 comprises side members 4 and 5 of which lower portions are parallel but upper, inclined portions meet in a point, giving the frame a generally triangular shape. To this top point a horizontally extending bar 6 is connected, and on the under side of bar 6 an arm 7 is rotatably mounted. The centre of rotation 8 of the arm 7 is placed above the centre of a bale 9 of straw or hay to be wrapped. The arm 7 can be rotated by a hydraulic motor 10. To the free outer end of the arm 7 a shaft 11 is secured so as to depend perpendicularly. The shaft 11 carries a freely rotatable roll 12 of stretchable self-sealing plastic film. Rollers 13 and 14 are mounted with their axes parallel at the lower ends of frame portions 4 and 5 from which they extend outwards and, in use, are usually horizontal. The rollers 13 and 14 form the lowermost members of the device as the lower edge of a transverse bracing bar 15 is above the lower portions of the rollers 13,14. The rollers 13,14 can be rotated by a hydraulic motor 16, through transmission means which may, for example, comprise direct gear drive for one roller 13 and belt drive for the other roller 14. Obviously, it is also possible to arrange motor 16 to drive a belt driving both the rollers 13 and 14.

To the face of the frame 1 turned away from arms 2 a combined cutting and holding device for film 12' is secured. This device comprises a hydraulic cylinder 17 having a piston rod to which is attached an arm 18 projecting from the rod at right angles. To the outward end of the arm 18 is secured a V-shaped plate 19 having its opening facing downwards. The arm 18 is guided by a slot 20 in a tube 21 extending coaxially with cylinder 17. From its lower end the slot 20 extends axially upwards in the tube 21 and ends in an inclined slot 22 at the upper end. The V-shaped plate 19 cooperates with a resilient stop 23 attached to a bracket 24 which projects from the transverse brace 15. On two opposing sides the stop 23 is confined by a pair of plates 24,24' each shaped into an inclined edge 25 at its upper inward facing portions. Close to one side of the stop 23 a knife 26 is provided. During the downward movement of the V-shaped plate 19 a vertical edge 27 of the plate 19 will pass along the inside of knife 26.

Figure 5:
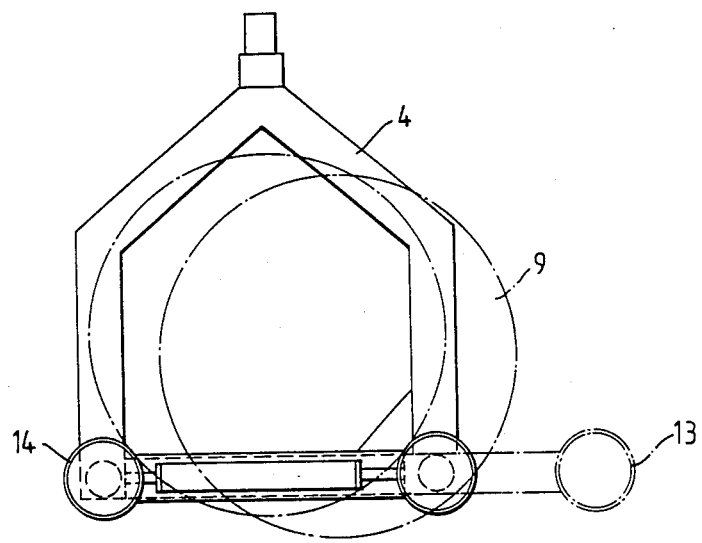
FIG. 5 shows a modified embodiment in front elevation.
Figure 6:
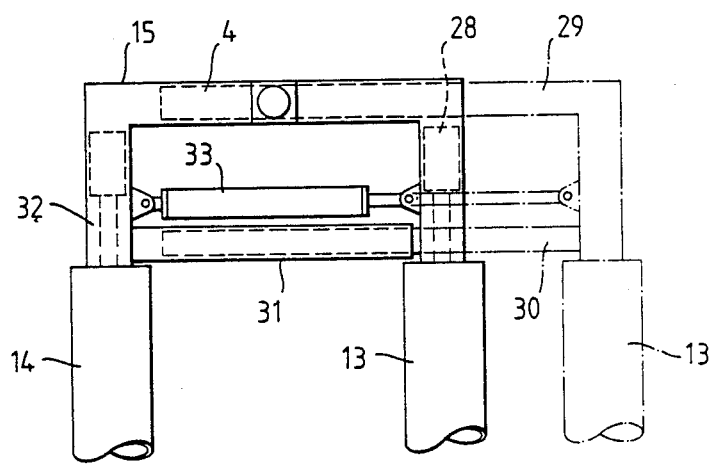
FIG. 6 shows the embodiment of FIG. 5 in plan view.

In FIGS. 5 and 6 a modified embodiment of the arrangement according to the invention is shown. One supporting roller 13 is rotatably secured to a U-shaped holder 28 having slidable legs. One leg 29 is slidable in the transverse brace 15 and leg 30 is slidable in a square tube 31 secured to a holder 32 which is rigidly attached to frame 4 and carries the other roller 14. A hydraulic cylinder 33 is secured by one end to holder 32. At the other end a piston rod of the hydraulic cylinder 33 is connected to act on the U-shaped holder 28. As shown in FIGS. 5 and 6, the mutual distance between rollers 13 and 14 is thus adjustable.

Both embodiments of the present invention operate as follows:

A bale 9 to be wrapped lies originally with its curved surface resting on the ground where it was left by a baler. The tractor or the like is driven in with the two rollers 13 and 14 placed so that a roller is inserted at each side of the bale. In order to simplify the insertion each roller 13,14 is provided with a conical end cap 28. The rollers 13,14 are rotated and the roll 12 of plastic film is moved around the bale 9 by the driven crank arm 7. During the first turn the end of plastic film 12' is held between the V-shaped plate 19 and the resilient stop 23. When one turn of the roll 12 has been completed the arm 18 with the V-shaped plate 19 is moved upwards and will swing inwards away from the bale 9, owing to the inclined slot 22, so that the V-shaped plate remains above and clear of the plastic film which extends between the roll 12 and the circumference of the bale 9. The rotational speed of the rollers is approximately the same as that of the arm 17 but as the bale is about five times the diameter of the rollers 13 14, when the bale 9 has rotated about 180° the arm 17 has moved the roll 12 about five turns around the bale 9 and the bale is then completely wrapped. The rotation of the rollers 13,14, and the rotation of crank arm 7 is stopped. Film 12' now extends obliquely from the edge of bale 9 to roll 12 with the lower edge of the film over the stop 23. Cylinder 17 is activated and arm 18 is moved downwards. The V-shaped plate straddles the upper edge of film 12' and brings it along downwards. During this movement the film will be gathered together by the V-shaped plate, acting as a collector, and is in this shape urged towards stop 23. The arm 18 with V-shaped plate 19 is moved further downwards, so that the V-shaped plate is urged down alongside the knife 26. Thus, the gathered film is cut by the knife. The wrapped bale 9 is tipped off rollers 13,14. This is done by extending cylinder 3 so that the rollers 13 and 14 are tilted forwards and the bale 9 slides off the rollers. The end of the film from roll 12 is held by the V-shaped plate 19 against the stop 23 until a new bale 9 is loaded and the roll 12 has moved one full turn around this bale to have the film locked to the bale by one layer of film. Then the arm 18 together with the plate 19 is moved upwards again.

Figure 2:
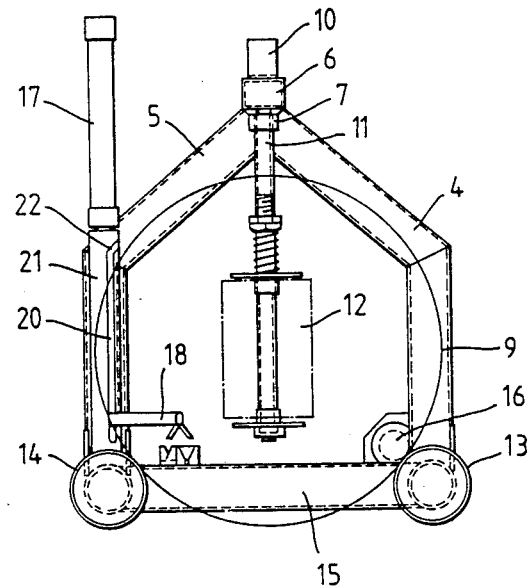
FIG. 2 shows the device in front elevation.
Figure 3:
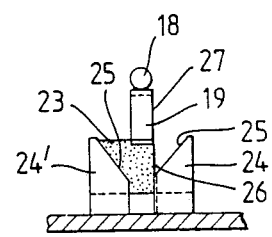
FIG. 3 shows a detail of a cutting member for wrapping film in side elevation.
Figure 4:
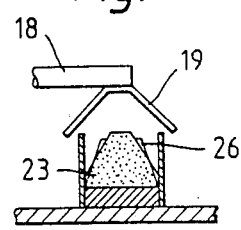
FIG. 4 shows the same detail in front elevation.

The object of being able to adjust the mutual distance between rollers 13 and 14 in the embodiment of FIGS. 5 and 6 is that a bale 9 resting on the ground will get flattened at the portion resting against the ground, as indicated in FIG. 5. With fixed position rollers 13 and 14, as shown in FIG. 2, it will be difficult to get in beneath the bale to lift it. When a bale rests on the ground and is to be lifted from the ground to be treated with the device shown in FIGS. 5 and 6, the rollers 13 and 14 are moved apart, as shown by dot-and-dash-lines in FIGS. 5 and 6. The rollers can then be introduced under a wider part of the bale and during the lifting operation the rollers 13,14 may be moved closer to each other to the position shown by full lines in FIGS. 5 and 6 to provide a more central support of the bale during wrapping. When the completely wrapped bale is put down it is moved down towards the ground and the rollers are moved apart so that the bale rests on the ground and the device may be withdrawn.

I claim:

1. A wrapping device for wrapping cylindrical objects having a central axis, such as bales of straw or hay, comprising at least a first rotatable roller and a second rotatable roller, drive means, lifting means adapted to vary the height of said rollers, and carrier means adapted to support a roll of stretchable self-adhesive film, said rollers each comprising a prong having a first end attached to said lifting means and an unattached free end spaced from said lifting means, said rollers extending in use of the device substantially horizontally and being spaced apart by a distance less than diameter of the cylindrical object to be wrapped whereby said object can be supported by said rollers with its central axis extending substantially horizontally, at least one of said rollers being rotationally driven by said drive means whereby to rotate said cylindrical object about its central axis, said roll of film being supported by said carrier means with the axis of said roll at right angles to a plane containing said central axis of said object and being movable by said support means in an orbit around said cylindrical object with said roll intersecting said plane, rotation of said cylindrical object combined with orbiting of said roll wrapping said object in film from said roll, and wherein said lifting means is adapted to vary the height of said rollers between a raised position in which said object is supported by said rollers and a lowered position in which said free ends of said rollers may be inserted under said object prior to lifting said object off a surface upon which said object rests.

2. A wrapping device according to claim 1, wherein said lifting means comprises a rigid frame having a face to which said first ends of said rollers are attached and an opposite face provided with attachment means for attaching said frame to a lifting mechanism of a vehicle.

3. A wrapping device according to claim 2, wherein said attachment means are provided at a lower portion of said opposite face, and further attachment means are provided at an upper portion of said opposite face of said frame for attaching said frame to an adjustable tension stay on the vehicle to which the wrapping device is to be attached.

4. A wrapping device according to claim 1, wherein said carrier means comprises a crank arm extending substantially horizontally and a rotatable about a substantially vertical wrapping axis, and further comprises means for rotating said crank arm about said wrapping axis, said crank arm carrying said roll of film with the axis of the roll of film substantially vertical and offset from said wrapping axis.

5. A wrapping device according to claim 2, wherein said frame further comprises a support arm extending substantially parallel with said rollers, and wherein said carrier means comprises a crank arm extending substantially horizontal and pivotally connected to said support arm so as to be rotatable about a substantially vertical wrapping axis, said roll of film being carried by said crank arm.

6. A wrapping device according to claim 5, wherein said frame has a generally triangular shape with a point facing upwards in its position of use, and supports a driving motor for driving said crank arm, and said support arm extends from a region of said frame adjacent said point.

7. A wrapping device according to claim 4, wherein said rollers are driven to rotate said object at a rotational speed and said crank arm is rotated about said wrapping axis at a speed such that said crank arm rotates through about five turns for each half-turn of said object.

8. A wrapping device according to claim 7, wherein said support means moves said roll vertically during a wrapping cycle whereby said object is wrapped in a full wrapping cycle after said object has been rotated by a half-turn.

9. A wrapping device according to claim 1 further comprising a fork member, gathering means for moving said fork member into the path of said film, a stop, and a knife mounted adjacent said stop with its edge facing upwards and extending across the plane of the film path, said gathering means moving said fork member against said film at the end of a wrapping cycle and causing said fork member to gather said film and urge said film against said stop so as to grip said film and cause said knife to cut film which is wrapped around said object from said roll, creating a free end of film coming from said roll, said free end of said film being gripped between said fork member and said stop at its creation.

10. A wrapping device according to claim 9, wherein said fork member comprises a pair of generally opposed fork prongs which define a fork recess between them, said fork prongs guiding said film into said fork recess during movement of said fork member.

11. A wrapping device according to claim 10, wherein said stop is resilient and is compressed by said fork member prior to said knife cutting said film.

12. A wrapping device according to claim 1, wherein said first and second rollers are movable relative to each other, adjustment means being provided for varying the separation of said first and second rollers.

13. A wrapping device according to claim 12, wherein said adjustment means comprises a guide and a U-shaped holder and the legs of which are slidingly movable in said guide, one of said rollers being secured to said holder.

14. A wrapping device according to claim 1, wherein said object is supported, in use of the device, by only said first and second rollers.

15. A vehicle incorporating a wrapping device as claimed in claim 1.

16. A wrapping device for wrapping cylindrical objects having a central axis, such as bales of straw or hay, comprising at least a first and second rotatable roller, drive means, and carrier means adapted to support a roll of stretchable self-adhesive film, said rollers extending in use of the device substantially horizontally and being spaced apart by a distance less than the diameter of the cylindrical object to be wrapped whereby said object can be supported by said rollers with its central axis extending substantially horizontally, at least one of said rollers being rotationally driven by said drive means whereby to rotate said cylindrical object about its central axis, said roll of film being supported by said carrier means with the axis of said roll at right angles to a plane containing said central axis of said object and being movable by said support means in an orbit around said cylindrical object with said roll intersecting said plane, rotation of said cylindrical object combined with orbiting of said roll wrapping said object in film from said roll, and wherein said device further comprises a collector, a stop, a knife provided adjacent said stop, and gathering means for moving said collector, said collector comprising a fork-shaped member movable in a gathering pass across that part of the path of said film that extends from said roll to said object, said gathering pass moving said fork-shaped member from one side edge of said film linearly across the width of said film and into engagement with said stop, said fork-shaped member having a pair of generally opposed fork prongs which define a fork recess between them and moving in said gathering pass at the end of a wrapping operation to engage said one side edge of said film with said fork prongs disposed to either side of the surface of said film, said film being gathered into said fork recess as said fork-shaped member moves linearly across the width of said film, said fork-shaped member urging said film against said knife to sever said film at the end of said gathering pass, the free end of said film coming from said roll being gripped between said stop and said fork-shaped member as said film is severed.

17. A wrapping device according to claim 16, wherein said stop is resilient.

* * * * *